United States Patent [19]

Tatsuji

[11] Patent Number: 4,800,979
[45] Date of Patent: Jan. 31, 1989

[54] CANTILEVER REAR SUSPENSION SYSTEM FOR MOTORCYCLES

[75] Inventor: Seino Tatsuji, Saitama, Japan

[73] Assignee: Honda Giken Kogyo Kabushiki Kaisha, Tokyo, Japan

[21] Appl. No.: 888,529

[22] Filed: Jul. 21, 1986

[30] Foreign Application Priority Data

Jul. 19, 1985 [JP] Japan .................. 60-160761
Jul. 19, 1985 [JP] Japan .................. 60-160762
Jul. 20, 1985 [JP] Japan .................. 60-160883

[51] Int. Cl.$^4$ .................. B60G 7/04; B62K 25/20; B60K 13/04
[52] U.S. Cl. .................. 180/227; 180/296; 280/284
[58] Field of Search .................. 180/219, 227, 218, 226, 180/229, 230, 231, 296; 280/274, 275, 281 R, 283, 284, 285, 286, 288

[56] References Cited

U.S. PATENT DOCUMENTS

| | | | |
|---|---|---|---|
| 4,076,271 | 2/1978 | Doneque | 280/284 |
| 4,415,057 | 11/1983 | Yamaguchi | 180/227 |
| 4,544,044 | 10/1985 | Boyesen | 180/227 |
| 4,553,622 | 11/1985 | Cortanze | 180/227 |

FOREIGN PATENT DOCUMENTS 331162 10/1935 Italy .................. 280/285

*Primary Examiner*—John J. Love
*Assistant Examiner*—Everett G. Diederiks, Jr.
*Attorney, Agent, or Firm*—Lyon & Lyon

[57] ABSTRACT

A motorcycle having a cantilever-type rear swing arm pivotally mounted to the vehicle frame. A cushion member associated with the rear swing arm extends between the upper frame and linkage below the swing arm through an offset bore in the swing arm. A rear wheel is arranged on an axle supported at one end of the rear swing arm with a brake disc therebetween. The brake disc is aligned with the centerline of the vehicle as is the wheel rim. The hub of the wheel is arranged with a concavity to accommodate the brake disc. The swing arm is arranged such that it gradually increases in thickness as it extends rearwardly from the front pivot. The thickness is maximized near the center of the swing arm at locations which approach the mutual tangent lines of the pitch circles of drive and driven sprockets of a chain drive mechanism. Sliders are positioned to accommodate the chain when necessary.

4 Claims, 5 Drawing Sheets

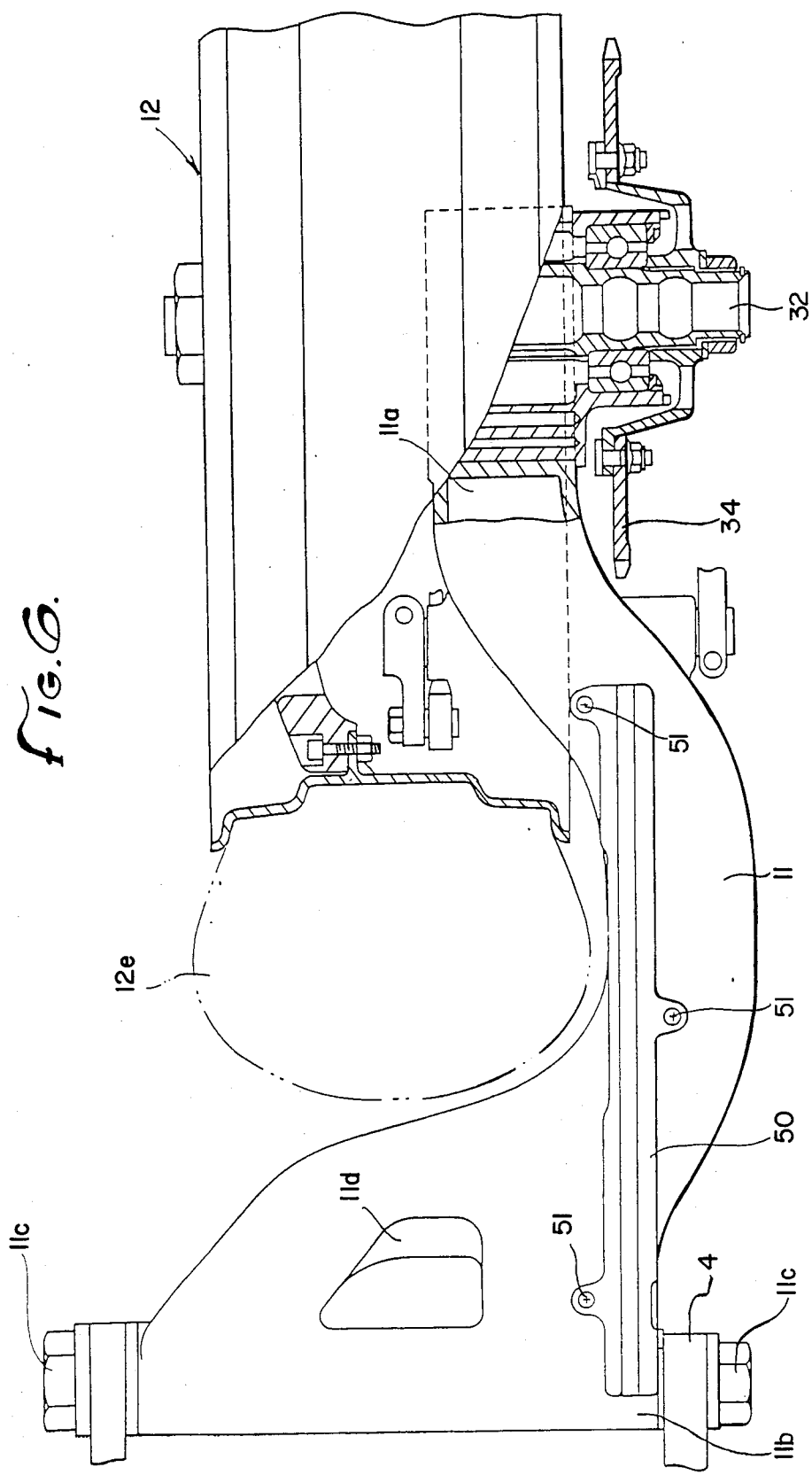

CANTILEVER REAR SUSPENSION SYSTEM FOR MOTORCYCLES

BACKGROUND OF THE INVENTION

The field of the present invention is rear suspension architecture for motorcycles.

Motorcycles have been developed, and particularly high performance motorcycles, which employ a cantilever rear swing arm. Such a swing arm is pivotally supported to the frame at a first end and extends along only one side of the wheel to a rear wheel hub. To gain increased longitudinal dimension for a cushion unit associated with such a rear suspension, mechanisms have been developed whereby the cushion member extends loosely through a bore in the rear swing arm and is coupled to linkage below the swing arm. The linkage is in turn coupled to the swing arm and to the frame. Such cushion members are placed along the centerline of the vehicle. In motorcycles with V-type engines having exhaust pipes extending rearwardly therefrom, the exhaust pipes are often directed down and under the rear suspension system. The exhaust arrangement, the cushion position and the rear fork pivot mechanism frequently interfere with one another in the design of compact motorcycle equipment such that compromises are often necessary. With such arrangements, it is often necessary to employ bulkier or heavier elements which can adversely affect the size, weight and operation of the vehicle. With a cantilever rear suspension system, added weight is typically required to accommodate the torque loadings resulting from the nonsymmetrical structure.

SUMMARY OF THE INVENTION

The present invention is directed to the structure and layout of rear suspension systems for motorcycles. An off-center cushion member is employed with a rear suspension which extends through the swing arm of a cantilever swing arm mechanism. The cushion member is offset from the centerline of the vehicle toward the cantilever swing arm structure. This arrangement reduces the overall loading at the pivot end of the swing arm, thereby reducing the structural requirements of the swing arm and its weight.

In another aspect of the present invention on a cantilever type rear suspension employing a chain drive system, a longitudinal section of the rear swing arm lying in the plane of the drive train may be arranged with the width of that section diverging from the pivot axis to a maximum at a midpoint along the swing arm. At its widest point, the structure approaches the tangent between the pitch circles of the drive and driven sprockets. Chain sliders may be applied to these upper and lower surfaces. This arrangement may help to guide the chain under certain conditions and provide appropriate strength for the swing arm itself.

In a further aspect of the present invention reduction in bending and torquing loads may be accomplished through an arrangement of the rear wheel and brake disc to reduce the extent of the cantilever arm extending laterally between the axle support and the rear wheel hub on such a swing arm. To this end, a concavity in the rear hub may be provided such that the brake disc can be located along the centerline of the vehicle between the swing arm and the wheel hub. Naturally, with the reduction in loading, size and weight may be reduced as well.

Therefore, it is an object of the present invention to provide an improved cantilever rear swing arm suspension system. Other and further objects and advantages will appear hereinafter.

BRIEF DESCRIPTION OF THE DRAWINGS

FIG. 6 is a plan view of the portion seen in FIG. 5.

DETAILED DESCRIPTION OF THE PREFERRED EMBODIMENT

Figure 1:
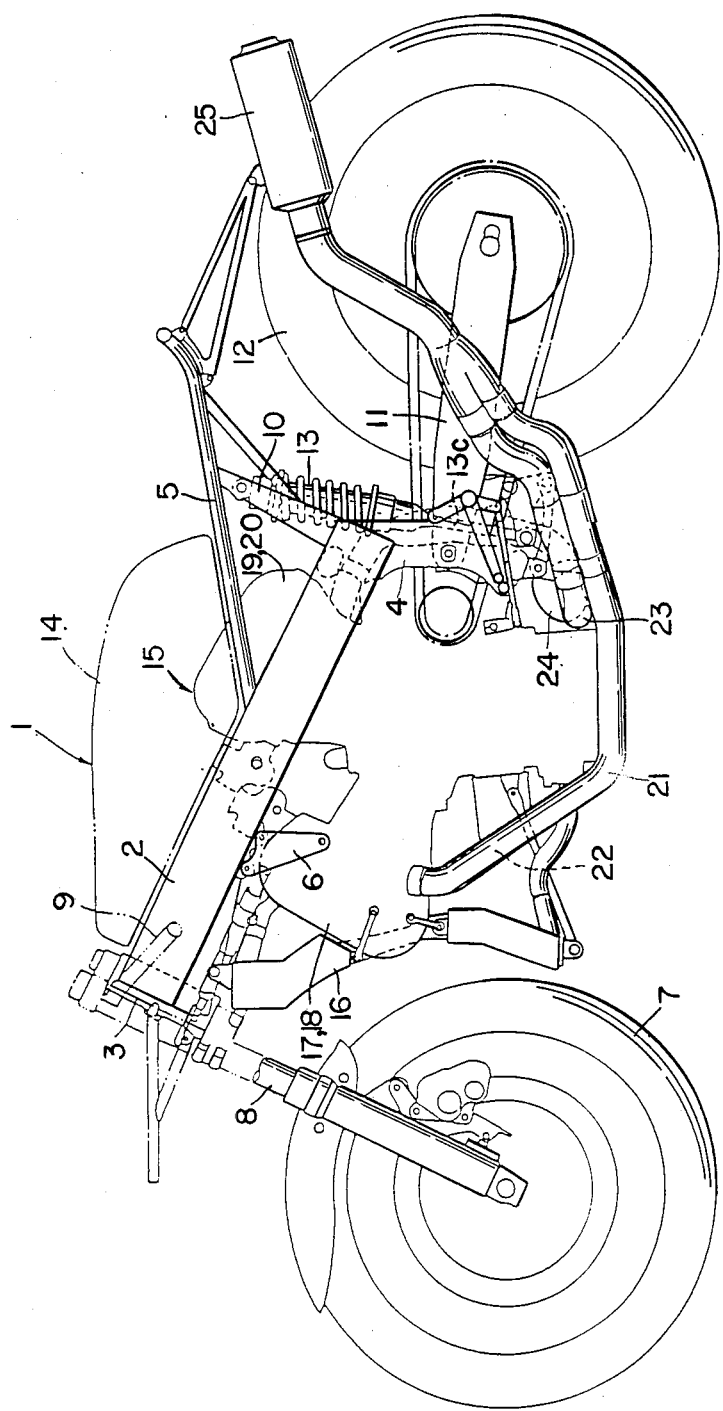
FIG. 1 is a side elevation of a motorcycle of the present invention.

Turning in detail to the drawings, FIG. 1 illustrates a side view of a motorcycle employing a cantilever rear swing arm according to the present invention. The motorcycle 1 has a main frame 2 which is symmetrically arranged with a rectangular cross section and the front portion thereof bowed outwardly from the headpipe arrangement and then rearwardly to either side of the vehicle. The main frame 2 includes the head pipe 3 and pivot plates 4 welded respectively at the front end and rear ends of the frame. A seat rail 5 extends rearwardly from the main frame while a hanger 6 depends from the center portion thereof. Provided on the head pipe 3 is a front fork assembly 8 supporting a front wheel 7 and coupled with a handlebar 9 for steering control.

Figure 2:
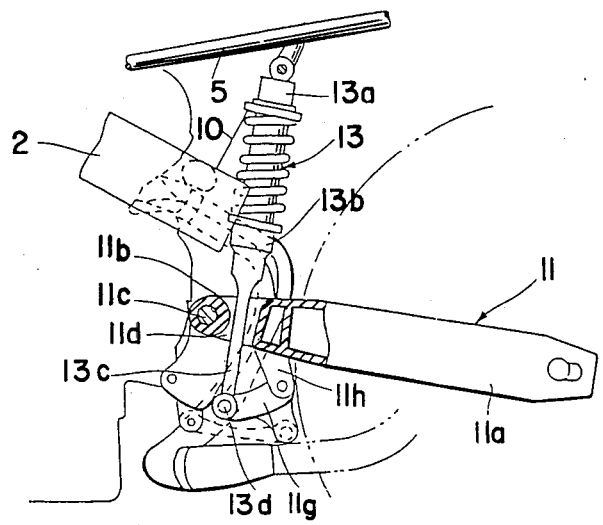
FIG. 2 is a side view with portions in section of the rear suspension arrangement of the present invention.
Figure 3:
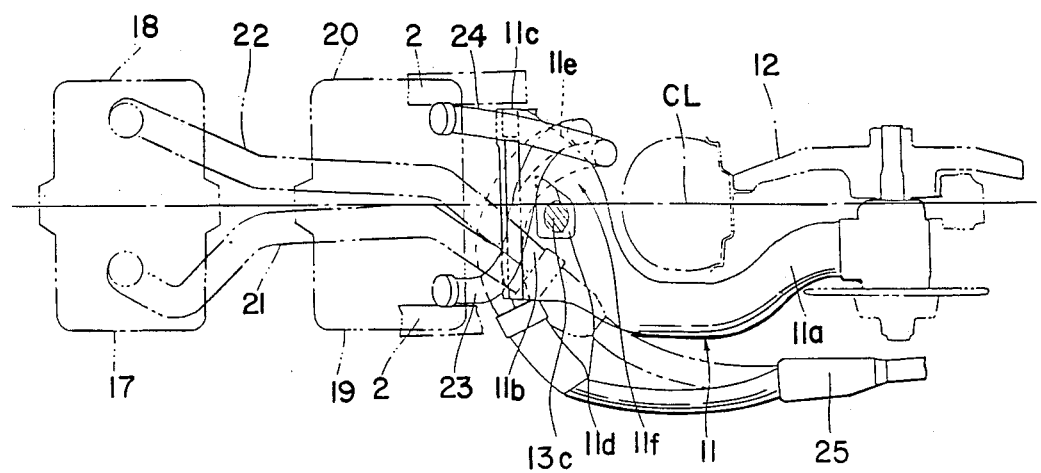
FIG. 3 is a plan view of the arrangement of FIG. 2.
Figure 4:
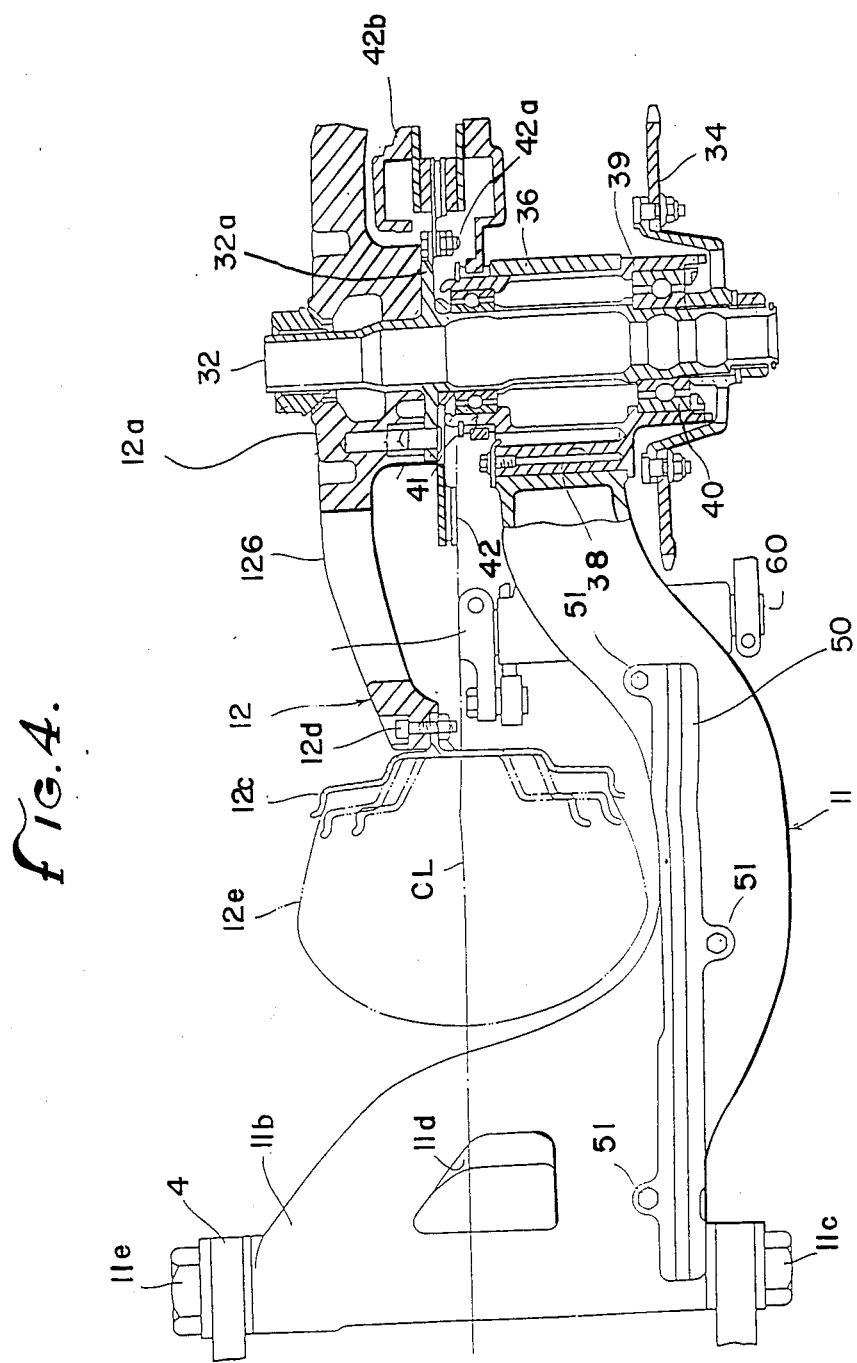
FIG. 4 is a cross-sectional view taken along IV—IV of FIG. 1.

The pivot plate 4 extends upwardly to meet a seat gusset plate 10 which is in turn fixed to the seat rail 5 at its upper end. At a lower end of the pivot plate 4 a cantilever rear swing arm 11 is pivotally mounted such that it may pivot upwardly and downwardly. A rear wheel 12 is supported on the rear swing arm 11 at a rear end 11a thereof. A cushion member 13 extends functionally between the rear swing arm 11 and the seat gusset plate 10. The front end or base end of the swing arm is pivotally mounted about a center position between the left and right pivot plates 4 through a pivot bearing 11c. As shown in FIGS. 2 and 3, the base end 11b of the rear swing arm 11 has a bore 11d extending downwardly through the arm. This bore is set within the broad portion of the rear swing arm 11 adjacent the base end thereof. The bore is shown to be slightly offset from to the centerline CL of the vehicle connecting the centers of the front and rear wheels. Through location of the bore offset from the centerline, the width of the portion 11f may be increased, adding to the rigidity of the base end 11b.

An upper end 13a of the rear suspension cushion member 13 is supported by means of a shaft to the seat gusset plate 10. The other end 13c of the cushion member 13 passes through the bore 11d with adequate clearance to be supported by a shaft at 13d of a linkage mechanism associated with the rear swing arm 11. A bracket 11h extends downwardly from the swing arm 11 to couple with a member 11g which is coupled at 13d with the lower end of the cushion member 13.

On a forward portion of the upper frame 2 and extending to the seat rail 5 is a fuel tank 14. A seat (not shown) is also provided on the seat rails 5. An engine 15 is arranged on the frame 2 with mountings at the engine hanger 6 and the pivot plate 4. A radiator 16 is arranged at the front of the engine 15.

The engine 15 is shown to be a V-type four cylinder engine arranged in a substantially upright position with the cylinder banks extending fore-and-aft. Cylinders 17 and 18 are associated with the front bank while cylinders 19 and 20 are associated with the rear bank. The cylinder banks include exhaust ports coupled with exhaust pipes 21 and 22 extending from the front bank and exhaust pipes 23 and 24 extending from the rear bank. The exhaust pipes 21 and 22 extend downwardly and then rearwardly where they are gathered as a single pipe to pass outwardly of the rear swing arm. The exhaust pipes 23 and 24 extend downwardly adjacent to the edge 11e of the base end 11b of the rear swing arm. The pipes are then bent generally in a U-shape to extend about the cushion member 13. The pipes are then accumulated in a single pipe to a muffler 25. Advantageously, the exhaust pipe links are arranged such that they are the same.

A chain drive is provided on the vehicle having a drive sprocket 33 on the engine 15 at the output of the transmission. A driven sprocket 34 is disposed on the rear axle 32. A chain 35 for transmitting rotary power from the engine to the rear axle extends about the drive sprocket 33 and driven sprocket 34.

A rear axle retaining portion 36 is arranged to extend near the centerline CL of the motorcycle body. The rear swing arm 11 includes an inwardly curved rear portion 11a to approach the centerline. A mounting bore 38 in the retaining portion 36 is fitted with an axle holder 39 in which the rear axle 32 is rotatably arranged in bearings 40 and 41.

The rear wheel 12 includes a hub 12a having spokes 12b extending outwardly to a wheel rim 12c. The spokes 12b are affixed to the wheel rim 12c by means of fasteners 12d. A tire 12e is arranged on the rim 12c. A concavity is formed within the hub 12a with the spokes extending in a curved path to join with the wheel rim. Thus, the hub of the wheel 12 is positioned to one side of the centerline CL while the support associated with the rear swing arm 11 is provided to the other side of the centerline CL.

A flange 32a on the axle 32 is arranged to meet with the hub 12a of the wheel 12. Studs retain the wheel in place on the axle in this way.

Also fixed to the flange 32a is a brake disc 42 disposed on the centerline CL of the motorcycle body frame by a plurality of bolts 42a. A rear brake caliper 42b is fitted in and secured to the axle holder.

The arrangement of the rear axle, the wheel hub and the brake disc is such that the cantilever effect of the wheel is minimized to reduce bending forces and the need for rigidity.

A longitudinal section lying in the plane of the chain 35 formed by the rear swing arm 11 presents a shape which tapers from the base portion 11b of the rear swing arm 11 outwardly to a central portion on the rear swing arm where the width is a maximum. This gradual tapering approaches the common tangent lines between the pitch circles of the drive sprocket 33 and the driven sprocket 34. The upper and lower faces of the swing arm 11 approach the maximum width as they approach the common tangent lines of the sprockets.

Fixed to the upper surface of the swing arm, also in the vertical plane of the drive chain, is a chain slider 50 attached by screws 51. A lower chain slider 52 is similarly arranged and attached by screws 53. The chain sliders 50 and 52 are of resin or rubber and are arranged where the chain is likely to contact the rear swing arm 11.

The chain 35 is not intended to abutt with the sliders 50 and 52 during normal running. Consequently, a small clearance is arranged for the chain. In the event that the chain becomes loose, it is guided so as not to interfere with power transmission.

Figure 5:
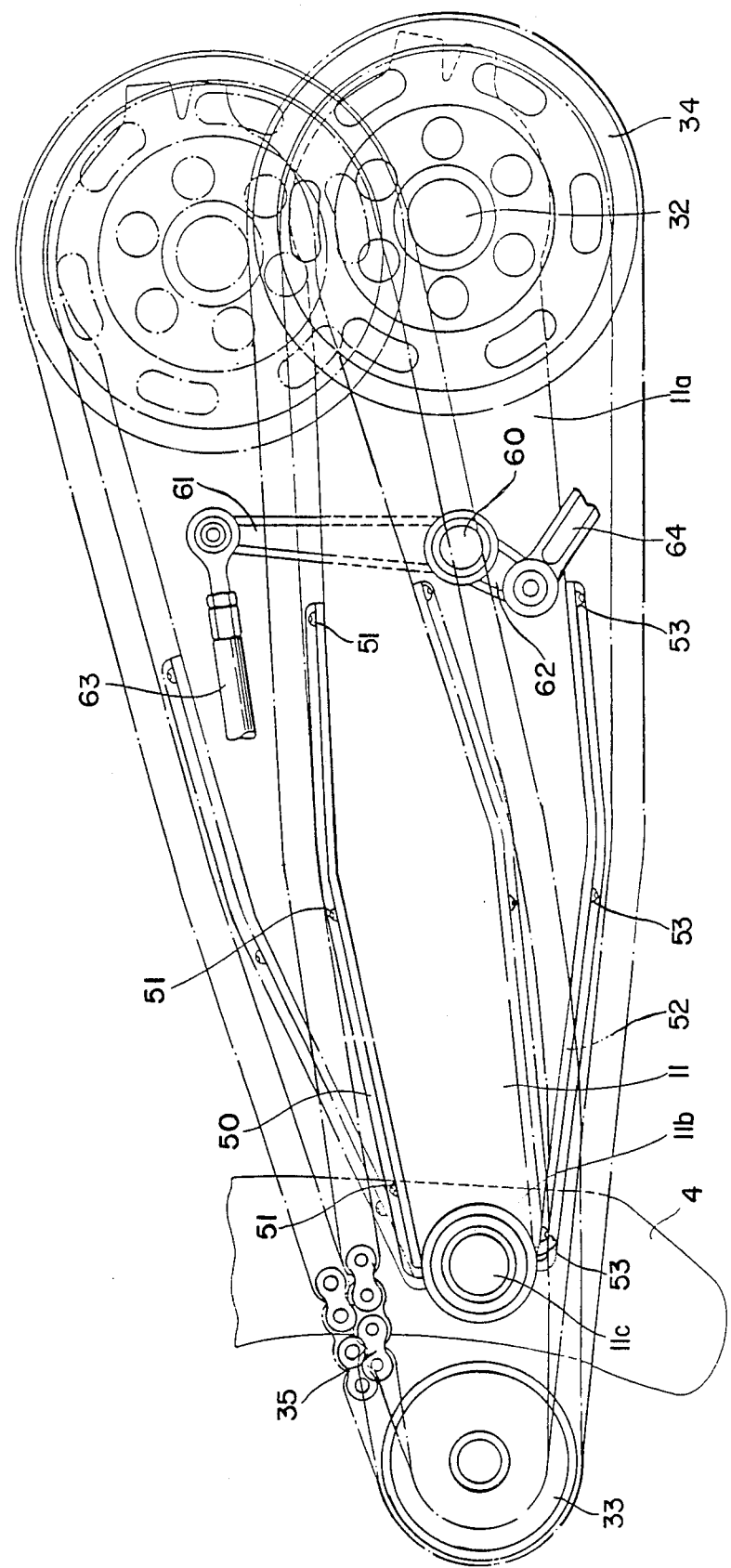
FIG. 5 is a side view of the rear swing arm and chain drive assembly with a second position of the rear swing arm illustrated in phantom.

A normal condition of the rear swing arm 11 is illustrated in solid line in FIG. 5. This condition is maintained during smooth road operation. In this condition the rear swing arm 11 does not receive major shocks from the road surface and the chain 35 is generally tense at its upper side and loose at its lower side. When the rear swing arm 11 receives a substantial shock from the road surface, the rear swing arm pivots upwardly to a position approximated in phantom line. The chain 35 may at that point be loose on its upper side and tensioned at its lower side. Thus, as can be seen in the drawing, the running of the chain under these conditions does not result in interference.

A torque rod 60 of a rear brake is arranged to extend to either outer wall of the swing arm 11. The torque rod 60 is provided with arms 61 and 62. Arm 61 is connected by means of a spherical joint with a torque link 63. The other arm is also connected by a spherical joint with the torque link 64. In this way, a braking force may be transmitted to the rear wheel brake.

Thus, a rear suspension system is illustrated which effectively reduced forces on the system such that light construction may be employed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A rear suspension for a motorcycle having a frame, a cantilever rear swing arm pivotally mounted to the frame at a first end, an engine mounted to the frame having exhaust ports, a chain drive having a drive sprocket driven by said engine, a driven sprocket and a drive chain extending about said drive sprocket and said driven sprocket, exhaust pipes extending from the exhaust ports a bore through the swing arm adjacent the first end, a rear cushion member extending through the bore and a linkage coupled with the rear swing arm, the cushion being fixed at one end to the frame and at the other end to the linkage, wherein the improvement comprises the bore being displaced laterally from the centerline of the vehicle toward the cantilever portion of the cantilever rear swing arm and at least one of the exhaust pipes extending downwardly adjacent the first end of the rear swing arm and being laterally displaced from the centerline of the vehicle in a direction opposite to the direction of displacement of said bore and said rear swing arm rotatably mounting said driven sprocket on the end opposite the first end and having a longitudinal section in the plane of said drive chain, the vertically spaced sides of said section being defined by surface portions diverging oppositely from the respective ends of said rear swing arm to a maximum dimension intermediate said ends, said surface portions at said maximum dimension being disposed closely adjacent tangent lines extending between the pitch circles of said driven sprocket.

2. The rear suspension of claim 1 including chain sliders on said surface portions.

3. The rear suspension of claim 1 in which said rear swing arm includes an axle housing in the end opposite said first end; an axle rotatably supported by bearing means on one side of the vehicle centerline, in said axle housing; a wheel having a hub fixed for rotation on said axle; a brake disc fixed to said hub; and a brake caliper for engagement with said brake disc; and wherein the improvement comprises said brake disc and said bearing being disposed on opposite sides of said vehicle centerline and said brake caliper attaching said axle housing closely adjacent said vehicle centerline.

4. The rear suspension of claim 3 wherein the improvement further comprises said wheel hub including spokes extending outwardly to the wheel and fasteners for affixing the spokes thereto.

* * * * *

UNITED STATES PATENT AND TRADEMARK OFFICE
CERTIFICATE OF CORRECTION

PATENT NO. : 4,800,979
DATED : January 31, 1989
INVENTOR(S) : SEINO TATSUJI

It is certified that error appears in the above-identified patent and that said Letters Patent is hereby corrected as shown below:

In claim 1 (Col. 5, l. 1), after "said" insert -- drive sprocket and said --.

Signed and Sealed this

Twenty-fourth Day of October, 1989

Attest:

DONALD J. QUIGG

*Attesting Officer*  *Commissioner of Patents and Trademarks*